United States Patent
Phan et al.

(10) Patent No.: US 12,518,174 B2
(45) Date of Patent: Jan. 6, 2026

(54) SITE-WIDE OPTIMIZATION FOR MIXED REGRESSION MODELS AND MIXED CONTROL VARIABLES

(71) Applicant: INTERNATIONAL BUSINESS MACHINES CORPORATION, Armonk, NY (US)

(72) Inventors: Dzung Tien Phan, Pleasantville, NY (US); Nhan Huu Pham, Carrboro, NC (US); Lam Minh Nguyen, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 17/330,363

(22) Filed: May 25, 2021

(65) Prior Publication Data

US 2022/0383138 A1    Dec. 1, 2022

(51) Int. Cl.
*G06N 5/01* (2023.01)
*G06N 7/01* (2023.01)

(52) U.S. Cl.
CPC ............... *G06N 5/01* (2023.01); *G06N 7/01* (2023.01)

(58) Field of Classification Search
CPC ............. G06N 5/01; G06N 7/01; G06N 3/045
See application file for complete search history.

(56) References Cited

U.S. PATENT DOCUMENTS

| 7,587,804 B2 | 9/2009 | Steinhilper et al. |
| 10,223,172 B2 | 3/2019 | Eda et al. |
| 10,430,725 B2 * | 10/2019 | Anderson ............... G06N 20/00 |
| 10,570,717 B2 | 2/2020 | Conn et al. |
| 10,890,898 B2 | 1/2021 | Akella et al. |
| 11,099,529 B2 | 8/2021 | Phan et al. |
| 2003/0097243 A1 * | 5/2003 | Mays ................... G05B 13/042 703/2 |
| 2020/0004592 A1 | 1/2020 | Eda et al. |

(Continued)

OTHER PUBLICATIONS

Kim, K., Botterud, A., Qiu, F., "Temporal Decomposition for Improved Unit Commitment in Power System Production Cost Modeling," IEEE Transactions on Power Systems, vol. 33, No. 5, pp. 5276-5287, Sep. 2018 (Year: 2018).*

(Continued)

*Primary Examiner* — Mariela Reyes
(74) *Attorney, Agent, or Firm* — CHIP LAW GROUP

(57) ABSTRACT

A computer-implemented method for site-wide prediction optimization includes training a plurality of a mixed type of regression models with a mixed type of control variables for identifying control set-points of a site-wide operation. A decision tree regression model is trained to predict a status of the plurality of initial set-points for non-linear regression functions. The decision tree regression model is reformulated into a mixed-integer linear program (MILP) and solved by an MILP solver to find a global solution. An MILP surrogate is determined for a nonlinear optimization problem to provide a best solution for one or more of the non-linear regression functions using the best solution as a starting point for solving non-linear regression functions, and a set-point of the mixed control variables is recommended to control a throughput of the site-wide operation by executing a decomposition operation or a federated learning algorithm.

25 Claims, 16 Drawing Sheets

(56) References Cited

U.S. PATENT DOCUMENTS

| | | |
|---|---|---|
| 2020/0162559 A1 | 5/2020 | Sustaeta et al. |
| 2020/0210532 A1 | 7/2020 | Matei et al. |
| 2020/0320757 A1 | 10/2020 | Simonovic et al. |

OTHER PUBLICATIONS

Smith, E.M.B., Pantelides, C.C., "A symbolic reformulation/spatial branch-and-bound algorithm for the global optimisation of nonconvex MINLPs," Computers & Chemical Engineering, vol. 23, No. 4-5, pp. 457-478, 1999 (Year: 1999).*

Sun, K., Sun, X.A., "A Two-level ADMM Algorithm for AC OPF with Global Convergence Guarantees," arXiv:2008.12139v4, pp. 1-11, Apr. 2021 (Year: 2021).*

Verwer, S., Zhang, Y., Ye, Q.C., "Auction optimization using regression trees and linear models as integer programs," Artifical Intelligence, vol. 244, pp. 368-395, 2017 (Year: 2017).*

Duan, M., Liu, D., Ji, X., Liu, R., Liang, L., Chen, X., Tan, Y., "FedGroup: Efficient Clustered Federated Learning via Decomposed Data-Driven Measure," arXiv:2010.06870v4, pp. 1-11, Apr. 2021 (Year: 2021).*

Mell, P. et al., "Recommendations of the National Institute of Standards and Technology"; NIST Special Publication 800-145 (2011); 7 pgs.

Alattas, A. M. et al., "Integration of Nonlinear Crude Distillation Unit Models in Refinery Planning Optimization", Ind. Eng. Chem. Res. (2011); vol. 50, pp. 686.6870.

Alhajri, I. et al., "A Nonlinear Programming Model for Refinery Planning and Optimisation with Rigorous Process Models and Product Quality Specifications", Int. J. Oil, Gas and Coal Technology (2008), vol. 1:3, pp. 283-307.

Balasubramanian, K. et al., "Zeroth-order (Non)-Convex Stochastic Optimization via Conditional Gradient and Gradient Updates", Advances in Neural Information Processing Systems (2018), pp. 3459-3468.

Biegler, L.T. et al., "Large-Scale Nonlinear Programming Using IPOPT: An Integrating Framework for Enterprise-Wide Dynamic Optimization", Computers and Chemical Engineering (2009), vol. 33, pp. 575-582.

Donti, P.L. et al., "Task-based End-to-end Model Learning in Stochastic Optimization", Advances in Neural Information Processing Systems (2017), pp. 5484-5494.

Duhamel, C. et al., "Support Vector Machine and Monte Carlo Simulation for Robust Optimization of Industrial Processes", IEEE International Conference on Industrial Engineering and Systems Management (2015), pp. 988-997.

Friedman, J.H. et al., "An Introduction to Multivariate Adaptive Regression Splines", Statistical Methods in Medical Research (1995), vol. 4, pp. 197-217.

Harding, J.A. et al., "Data Mining in Manufacturing: A Review", Journal of Manufacturing Science and Engineering (2006), vol. 128, pp. 969-976.

Jones, M. et al., "Superstructure Optimization of Oleochemical Processes with Surrogate Models", Computer Aided Chemical Engineering (2018), vol. 44, pp. 277-282.

Khuri, A. I., et al., "Response Surface Methodology", WIREs Computational Statistics (2010), vol. 2, pp. 128-149.

Kotsiantis, S.B. "Decision Trees: A Recent Overview", Artif. Intell. Rev. (2013), vol. 39:261-283.

Lee, J. et al., "A Cyber-Physical Systems Architecture for Industry 4.0-Based Manufacturing Systems", Manufacturing Letters (2015), vol. 3, pp. 18-23.

Lee, J. et al., "Service Innovation and Smart Analytics for Industry 4.0 and Big Data Environment", Procedia CIRP (2014), vol. 16, pp. 3-8.

Lombardi, M. et al., "Boosting Combinatorial Problem Modeling with Machine Learning", arXiv:1807.05517v1 [cs.AI] (2018), 8 pgs.

Maggiar, A. et al., "A Derivative-Free Trust-Region Algorithm for the Optimization of Functions Smoothed Via Gaussian Convolution Using Adaptive Multiple Importance Sampling", Siam J. Optim. (2018), vol. 28:2, pp. 1478-1507.

Phan, D. T. et al., "Regression Optimization for System-level Production Control" American Control Conference (ACC-2021), 8 pgs.

Quirante, N. et al., "Large Scale Optimization of a Sour Water Stripping Plant Using Surrogate Models", Computers and Chemical Engineering (2016), http://dx.doi.org/10.1016/j.compchemeng.2016.04.039, 62 pgs.

Quirante, N. et al., "Optimization of Chemical Processes Using Surrogate Models Based on a Kriging Interpolation", Computer Aided Chemical Engineering (2015), vol. 37, pp. 179-184.

Rivest, R. L. "Learning Decision List", Machine Learning (1987), vol. 2, pp. 229-246.

Sadati, N. et al., "Observational Data-Driven Modeling and Optimization of Manufacturing Processes", Expert Systems with Applications (2018), vol. 93, pp. 456-464.

Stojanovic, L. et al., "Big-Data- Driven Anomaly Detection in Industry (4.0): An Approach and a Case", IEEE International Conference on Big Data (2016), pp. 1647-1652.

Sun, K. et al., "A Two-Level Distributed Algorithm for Nonconvex Constrained Optimization", arXiv:1902.07654v5 [math.OC] (2022), 38 pgs.

Tran, A.P. et al., "On the Estimation of High-Dimensional Surrogate Models of Steady-State of Plant-wide Processes Characteristics", Computers and Chemical Engineering (2018), 46 pgs.

Tu, C. et al., "AutoZOOM: Autoencoder-based Zeroth Order Optimization Method for Attacking Black-box Neural Networks", AAAI Conference on Artificial Intelligence (2019), 13 pgs.

Vincent, B. et al., "An Industrial Process Optimization Approach Based on Input and Output Statistical Data Analysis", IFAC-PapersOnLine (2015), vol. 48:3, pp. 930-935.

Wang, Y. et al. "Global Convergence of ADMM in Nonconvex Nonsmooth Optimization", Journal of Scientific Computing (2019), Vo. 78:1, pp. 29-63.

Wilder, B. et al., "Melding the Data-Decisions Pipeline: Decision-Focused Learning for Combinatorial Optimization", Association for the Advancement of Artificial Intelligence (2018), 10 pgs.

Phan, D. T., "Site-Wide Operations Management Optimization for Manufacturing and Processing Control"; U.S. Appl. No. 16/998,642, filed Aug. 20, 2020; 38 pgs.

* cited by examiner

Algorithm 1: Two-level two-block ADMM algorithm for solving (17)

1: Initialize $\mathbf{W}^{(0)} := (\mathbf{x}_{l,t}^{(0)}, \mathbf{z}_{l,t}^{(0)}), \lambda_t^{(0)}, M > 0$ and index $k \leftarrow 1$;
2: while Stopping criterion is not satisfied do
3:    Step 1 For each layer $l = 1, \ldots, L$, solve (20) to get $\left(\mathbf{y}_{l,t}^{(k)}, \mathbf{s}_{l,t}^{(k)}, \mathbf{p}_{l,t}^{(k)}, \mathbf{q}_{l,t}^{(k)}\right)$ when $(\mathbf{x}_{l,t}^{(k)}, \mathbf{z}_{l,t}^{(k)})$ is fixed.
4:    Step 2. Perform two-block ADMM to update $(\mathbf{x}_{l,t}^{(k+1)}, \mathbf{z}_{l,t}^{(k+1)})$
5:    for $m = 1, 2, \ldots, M$ do
6:       for $t = 1, \ldots, T$ and $t$ is odd do
7:          for $l = 1, \ldots, L$ do
8:             Solve (21) to update $(\mathbf{x}_{l,t}^{\{m\}}, \mathbf{z}_{l,t}^{\{m\}})$
9:          end for
10:       end for
11:       Repeat previous steps 6-9 for even periods $t$ when $(\mathbf{x}_{l,t}^{\{m\}}, \mathbf{z}_{l,t}^{\{m\}})$ is fixed for any odd $t$.
12:    end for
13:    $(\mathbf{x}_{l,t}^{(k+1)}, \mathbf{z}_{l,t}^{(k+1)}) = (\mathbf{x}_{l,t}^{\{M\}}, \mathbf{z}_{l,t}^{\{M\}})$
14:    Update multipliers:
15:    $\lambda_t^{(k+1)} = \lambda_t^{(k)} + \rho h_t(\mathbf{w}^{(k)}), \quad t = 1, \ldots, T$
16:    $k \leftarrow k + 1$;
17: end while

FIG. 3C

Algorithm 3 : Federated Learning for Optimal Set-point Control

1: Initialization:
   The *central operator* initializes the set-points for every processes $(\mathbf{x}_{l,t}^{(0)}, \mathbf{z}_{l,t}^{(0)})$ and a vector signal $\boldsymbol{\lambda}_t^{(0)}$; and index $k \leftarrow 1$;
   The *central operator* sends algorithm parameters $\mu, \nu$ and $\rho$ to every clients
2: while Stopping criterion is not satisfied do
3:  Step 1
    The *central operator* solves a local optimization problem (20) to get $\left(\mathbf{y}_{l,t}^{(k)}, \mathbf{s}_{l,t}^{(k)}, \mathbf{p}_{l,t}^{(k)}, \mathbf{q}_{l,t}^{(k)}\right)$ and computes $\mathbf{b}_{l,t}^{(k)} = A_{l,t}^1 \mathbf{y}_{l,t}^{(k)} + C_{l,t}^1 \mathbf{s}_{l,t}^{(k)}$
4:  Step 2
    The *central operator* sends a vector signal $\left(\boldsymbol{\lambda}_{l,t}^{(k)}, \mathbf{b}^{(k)}_{l,t}, \mathbf{s}_{l,t}^{(k)}, \mathbf{p}_{l,t}^{(k)}, \mathbf{q}_{l,t}^{(k)}\right)$ to the $l$-th client.
5:  Step 3
    The $l$-th *client* solves its own optimization problem (21) for odd periods $t$, then for even periods $t$.
6:  Step 4
    The $l$-th *client* computes
    $$\mathbf{c}_{l,t}^{(k)} = f_l(\mathbf{z}_{l-1,t}^{(k)}, \mathbf{x}_{l,t}^{(k)}), \quad \mathbf{d}_{l,t}^{(k)} = \mu \odot \begin{bmatrix} \mathbf{x}_{l,t}^{(k)} \\ \mathbf{x}_{l,t}^{(k)} \end{bmatrix} + \nu \odot \begin{bmatrix} \mathbf{x}_{l,t+1}^{(k)} \\ \mathbf{x}_{l,t+1}^{(k)} \end{bmatrix}$$
7:  Step 5
    The $l$-th *client* sends a vector signal $(\mathbf{c}_{l,t}^{(k)}, \mathbf{d}_{l,t}^{(k)}, \mathbf{z}_{l,t}^{(k)})$ to the central operator.
8:  Step 6
    The *central operator* carries out the update $\boldsymbol{\lambda}_t^{(k+1)} = \boldsymbol{\lambda}_t^{(k)} + \rho h_t(\mathbf{w}^{(k)}), \quad t = 1, \ldots, T$ and $k \leftarrow k+1$.
    The *central operator* checks the stopping criterion to decide termination for the algorithm .
9: end while

FIG. 9B

SITE-WIDE OPTIMIZATION FOR MIXED REGRESSION MODELS AND MIXED CONTROL VARIABLES

BACKGROUND

Technical Field

The present disclosure generally relates to systems and methods for developing smart machines using big data and analytics to perform production control, and more particularly, to performing prediction optimization with mixed regression models and mixed control variables.

Description of the Related Art

In manufacturing and industry practices, there is an increasing use of large-scale machine-to-machine communication to produce smart machines to analyze and act on identified conditions automatically. Industry 4.0 is a movement to digitally transform the operation of machines of all types, so as to deliver real-time decision making with enhanced productivity, agility, and flexibility. For example, production facilities are incorporating technologies such as the Internet of Things (IoT), cloud computing, analytics, AI, and machine learning into operations.

A digital semantic representation of industrial operations from, for example, a manufacturing or processing plant is continuously replenished with data from sensor networks to provide real-time measurements. However, the ability to perform real-time adjustments for optimal set points, particularly in a case of big data operations, is difficult to implement. For example, the use of surrogate models for optimizing production processes are normally used during a design phase. Thus, if there is no plant simulator based on a surrogate model, or only historical data is available, there is in inability to automatically execute the real-time adjustments that can optimize operations.

SUMMARY

According to one embodiment, a computer-implemented method for site-wide prediction optimization includes training a plurality of a mixed type of regression models with a mixed type of control variables for identifying control set-points of a site-wide operation. A decision tree regression model is trained to predict a status of the plurality of initial set-points for non-linear regression functions. The decision tree regression model is reformulated into a mixed-integer linear program (MILP) and solved by an MILP solver to find a global solution. An MILP surrogate is determined for a nonlinear optimization problem to provide a best solution for one or more of the non-linear regression functions using the best solution as a starting point for solving non-linear regression functions, and a set-point of the mixed control variables is recommended to control a throughput of the site-wide operation by executing a decomposition operation or a federated learning algorithm.

In an embodiment, the best (e.g., optimal) solution is provided from the MILP surrogate as a starting point for performing a primal-dual operation. A more accurate application of the primal-dual algorithm will result.

In an embodiment, the recommending of the set-point for the mixed control variables includes recommending set-points for one or more of a continuous variable, an integer variable, or a categorical variable mixed control variable. There is a wide array of variables that can have recommended set-points.

In an embodiment, the training of the mixed regression models includes selecting two or more model types including piece-wise linear models, nonlinear models or black-box models. There is enhanced flexibility in finding optimized operations by training the mixed regression models with multiple model types.

In an embodiment, a decomposition operation is performed by defining the two or more types of the mixed regression models as two sub-problems for recommending the set-point of each of the mixed control variables, and each subproblem is related to either a regression function or a convex quadratic program. A more accurate optimization can be found by separating the complex model problem into sub-problems and finding solutions for the sub-problems.

In an embodiment, the decomposition operation is a temporal decomposition of a problem into the two sub-problems. Temporal and spatial problems are often part of complex coupled models, and temporal decomposition enhanced the optimization process to find recommended set-points.

In an embodiment, training the decision tree regression model includes randomly generating samples of a controllable variable xi and estimating a function f (xi) of the controllable variable. The decision tree regression model can approach the accuracy of a deep neural network without the overhead or training to use a deep neural network.

In an embodiment, the site-wide operation comprises an oil sands production facility including a network of multiple plants with each plant having a set of inputs and outputs, and the method further comprises estimating an operation of each process of the network of the multiple plants using a regression function. A real improvement in petroleum processing in terms of efficiency and a quality of production is realized.

In an embodiment, each plant of the multiple plants of the network is arranged in a federated learning framework to preserve one or more of an objective information, a constraint information, and a private information. The federated learning framework preserves data-privacy while permitting the ability to have the individual entities tune their operations.

In an embodiment, the federated learning framework includes an automated central operator that initializes a plurality of set-points for every process of the network of multiple plants, a vector value and an index. Each of the multiple plants includes particular initialized set-points, the vector value and an index associated with the particular initialized set-points. The automated central operator updates the vector value after each plant performs a self-optimization problem and sends the information to the central operator. The automated central operator provides an ability to keep shared data private from other entities but benefit from the learning using the automated central operator.

According to one embodiment, a computer-implemented method for site-wide prediction optimization includes performing a decomposition operation of a site-wide optimization operation by defining two or more model types of mixed regression models and mixed control variables into respective suboperations. An optimization is performed for each of the respective suboperations by executing a plurality of iterations of the mixed regression models until a predefined convergence is obtained. Set-points of the mixed control variables are recommended based on the optimization of each of the respective suboperations. Decomposition makes a complex coupled model easier to solve and helps provide a more accurate solution.

In an embodiment, the performing of the optimization comprises a non-convex optimization of each of the respective suboperations to designate an optimal solution having a lowest loss from among two or more sub-optimal solutions. A more efficient and accurate optimization results from the use of non-convex optimization.

In an embodiment, the non-convex optimization includes selecting one or more of prediction models and operational constraints for each suboperation. There is enhanced flexibility in selecting models and applying the constraints to arrive at a more accurate solution.

In an embodiment, a decision tree regression model is configured to learn a nonlinear function to predict a status of a plurality of feed forward functions of the site-wide optimization operation. The decision tree regression model permits recommending set-points and changes to set-points in real time without requiring simulators.

In an embodiment, the site-wide optimization operation is performed based on training mixed regression models including at least two of piece-wise linear models, nonlinear models, black-box models, and mixed types of control variables, and the optimization operation is performed in parallel for at least two of the respective suboperations. The training using multiple types of models permits a more accurate optimization operation.

In an embodiment, a secure platform with privacy-preserving functions is provided for determining optimal set-points for a plurality of client nodes operating in a federated learning framework. Privacy-preserving functions of the secure platform is particularly beneficial in a number of fields associate with manufacturing and data processing.

According to an embodiment, a computing device is configured to perform site-wide prediction optimization. The computing device includes a processor, and a memory coupled to the processor. The memory stores instructions to cause the processor to perform acts that include training a plurality of mixed regression models for operating a plurality of feed forward functions with mixed control variables of a site-wide operation. A decision tree regression model to predict a status of the plurality of feed forward functions. The decision tree regression model is reformulated into a mixed-integer linear program (MILP). An MILP surrogate is determined for a nonlinear optimization problem to provide a best solution for one or more of the feed forward functions. A set-point of the mixed control variables is recommended to control a throughput of the site-wide operation. The reformulation into an MILP assists in the operation of a primal-dual algorithm to optimize an operation.

In an embodiment, the instructions cause the processor to perform an additional act of providing the best solution from the MILP surrogate as a starting point for performing a primal-dual operation.

In an embodiment, the recommended set-point for the mixed control variables includes set-points for one or more of a continuous variable, an integer variable, or a categorical variable mixed control variables. A broad selection of variables increases the ability to recommend set-points in a wide variety of applications.

In an embodiment, the training of the mixed regression models includes selecting two or more model types comprising piece-wise linear models, nonlinear models or black-box models. The more diversified training provides for more accurate optimization operations.

In an embodiment, the instructions cause the processor to perform an additional act of performing a decomposition operation by defining the two or more types of the mixed regression models as two subproblems for recommending the set-point of each of the mixed control variables. Decomposition makes a complex coupled model easier to solve and helps provide a more accurate solution.

In an embodiment, the decomposition operation performed is a temporal decomposition of a problem into the two subproblems.

In an embodiment, a non-transitory computer readable storage medium tangibly embodies a computer readable program code having computer readable instructions that, when executed, causes a computer device to perform a method of site-wide prediction optimization. The method includes performing a decomposition operation of a site-wide optimization operation by defining two or more mixed regression models and mixed control variables into respective suboperations. An optimization of each respective suboperation is performed by executing a plurality of iterations of the mixed regression models until a predefined convergence is obtained. Set-points of the mixed control variables are recommended based on the optimization of each of the respective suboperations. There is an enhancement in monitoring and tuning set-points, particularly in forward feed operations.

In an embodiment, the computer device is further configured to perform a non-convex optimization of each of the respective suboperations to designate an optimal solution having a lowest loss from among two or more sub-optimal solutions. More accurate optimizations result from finding the optimal solution having the lowest loss.

In an embodiment, the site-wide optimization operation is performed based on training mixed regression models including at least two of piece-wise linear models, nonlinear models, black-box models, and mixed types of control variables. The optimization operation is performed in parallel for at least two of the respective sub-operations. There is an enhancement in speed in addition to accuracy with parallel sub-operations.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3C illustrates a two-level two-block algorithm consistent with an illustrative embodiment.

FIG. 9B illustrates an algorithm for federated learning for optimal set point control, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

As used herein, the term "mixed model" refers to a statistical model that includes both fixed effects and random effects. A "mixed regression model" refers to a statistical model that provides a mathematical model of a relation between a dependent (e.g., response) variable and a set of independent variables.

In an illustrative embodiment, the computer-implemented method and system of the present disclosure is configured to optimize a set-point of each of a plurality of processes to maximize a throughput. An example of throughput is an end product manufactured/processed in a plant. The set-points of a plurality of processes can occur at a site-wide level and may include multiple plants. There is a feed-forward control of the processes that are performed to generate a throughput, where the outflow from an upstream process becomes an inflow into a downstream process. Each of the processes may have their own control variables.

Site-wide prediction optimization according to a method and system of the present disclosure is performed with mixed regression models including but not limited to piecewise linear models, nonlinear models (e.g., Deep Neural Networks), black-box models (e.g., random forest), and mixed types of control variables (continuous, integer, categorical). Such site-wide prediction optimization can include a scalable optimization algorithm with a convergence guarantee (the scalable optimization algorithm can operate in parallel). In addition, a secure platform is provided with privacy preservation for determining optimal set-points with many client nodes. The ability to arrive at a globally optimal solution for a nonconvex problem can be performed with an improved quality of the solution than known heretofore.

According to an aspect of the disclosure, a decomposition approach to determining optimal set points for a. coupled complex model is performed. A coupled complex model used for controlling the operations of a manufacturing or processing plant includes temporal coupling and spatial coupling. By decoupling the coupled complex model into subproblems (e.g., two or more), there can be an enhanced ability to optimize the set-points of various mixed control models.

Figure 1:
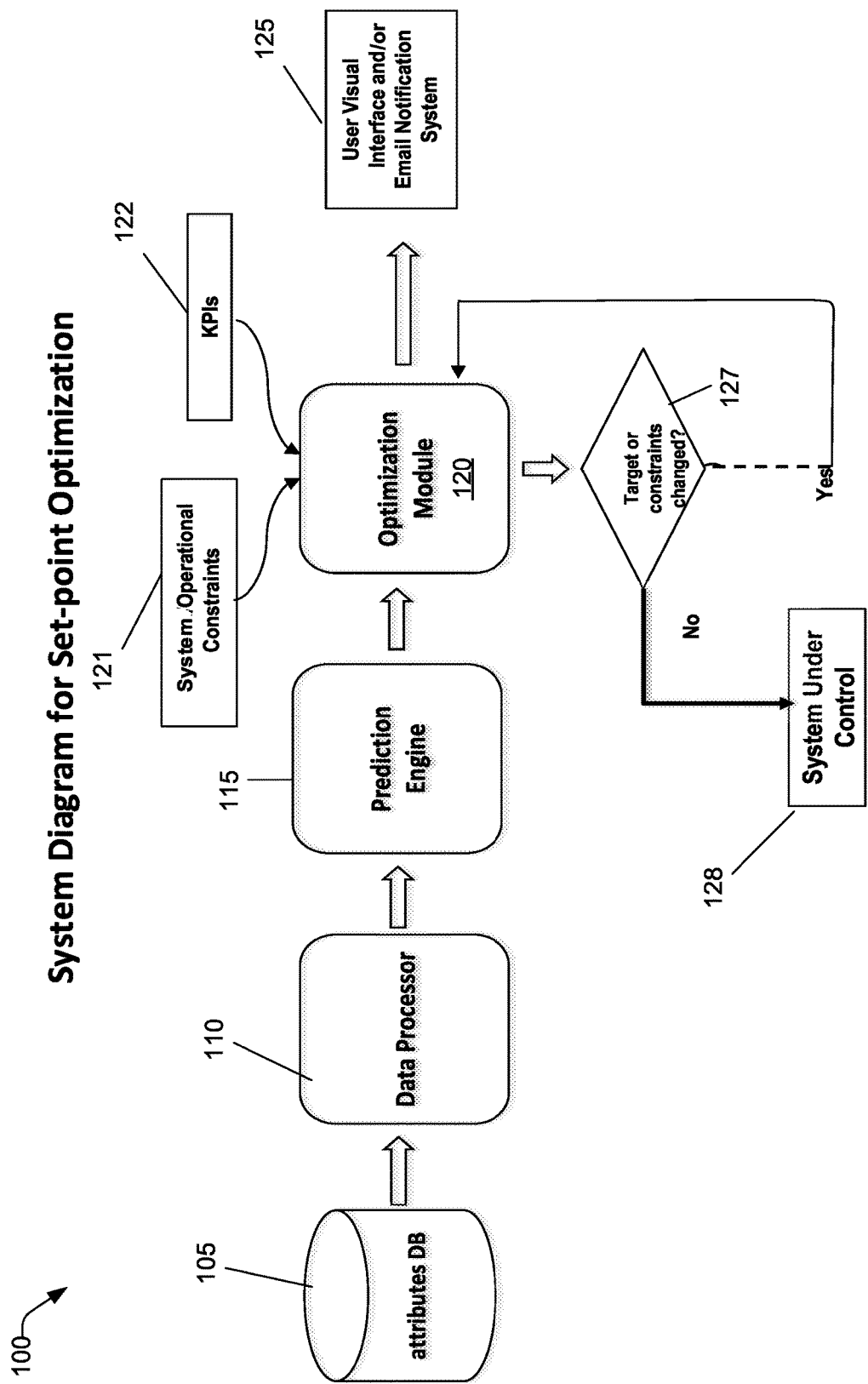
FIG. 1 is an overview illustrating a system of set-point optimization, consistent with an illustrative embodiment.

FIG. 1 is an overview 100 illustrating a system of set-point optimization, consistent with an illustrative embodiment. An attributes database 105 includes information about the various operations used to generate respective set-points. The attributes may be of any type, including but not in any way limited to composite, multi-valued, key, or derived. A data processor 110 is configured to operate various models such as mixed regression models and mixed control models that are created and tuned using data from the attributes database 105. The prediction engine 115 is configured to perform prediction modeling. The prediction modeling can include regression analysis models, descriptive models, to determine components of an optimization model. The optimization 120 module is configured to perform iterative comparisons of different solutions until a most satisfactory solution is found. There are time constraints regarding performing the iterations to find the most satisfactory solution. The optimization module 120 can also receive (in addition to the prediction modeling information from the prediction engine), operational constraints 121 and key performance indicators 122 to be used to find the most satisfactory solution. It is then determined (at operation 125) whether a target or constraints have been changed by the optimization module 120. If there are no changes to the targets or constraints, the system under control 128 may be optionally notified that no changes were made. However, if changes were made to target or constraints 127, then the optimization module 120 outputs the optimized set-points to a user notification system 125. For example, the user notification system 125 can be embodied as a visual interface, or an email notification system.

The computer-implemented method and computer device of the present disclosure advantageously provides improved performance. There is an improvement in the field of optimization using regression models and mixed control variables, as well as an improvement in computer operation. For example, more accurate set-points can be provided for a complex model, and particularly in a feed forward environment, the increased accuracy can improve the final throughput, whether such throughput is manufacturing or processing. Conventional approaches to optimization used simulations and lacked the ability to make adjustments in real time in view of attributes and constraints that can affect other processes within a site-wide operation. By virtue of the teachings herein, there is also an improvement in computer operation due in part to a reduction in processing overhead and storage can be realized, as well as a reduction in power consumed. Moreover, the use of a decision tree regression model, as disclosed herein, can approach the accuracy of a deep neural network without the investment in resources and training that is entailed in the use of a deep neural network.

Additional advantages of the computer-implemented method and device of the present disclosure are disclosed herein.

Example Embodiment

Figure 2:
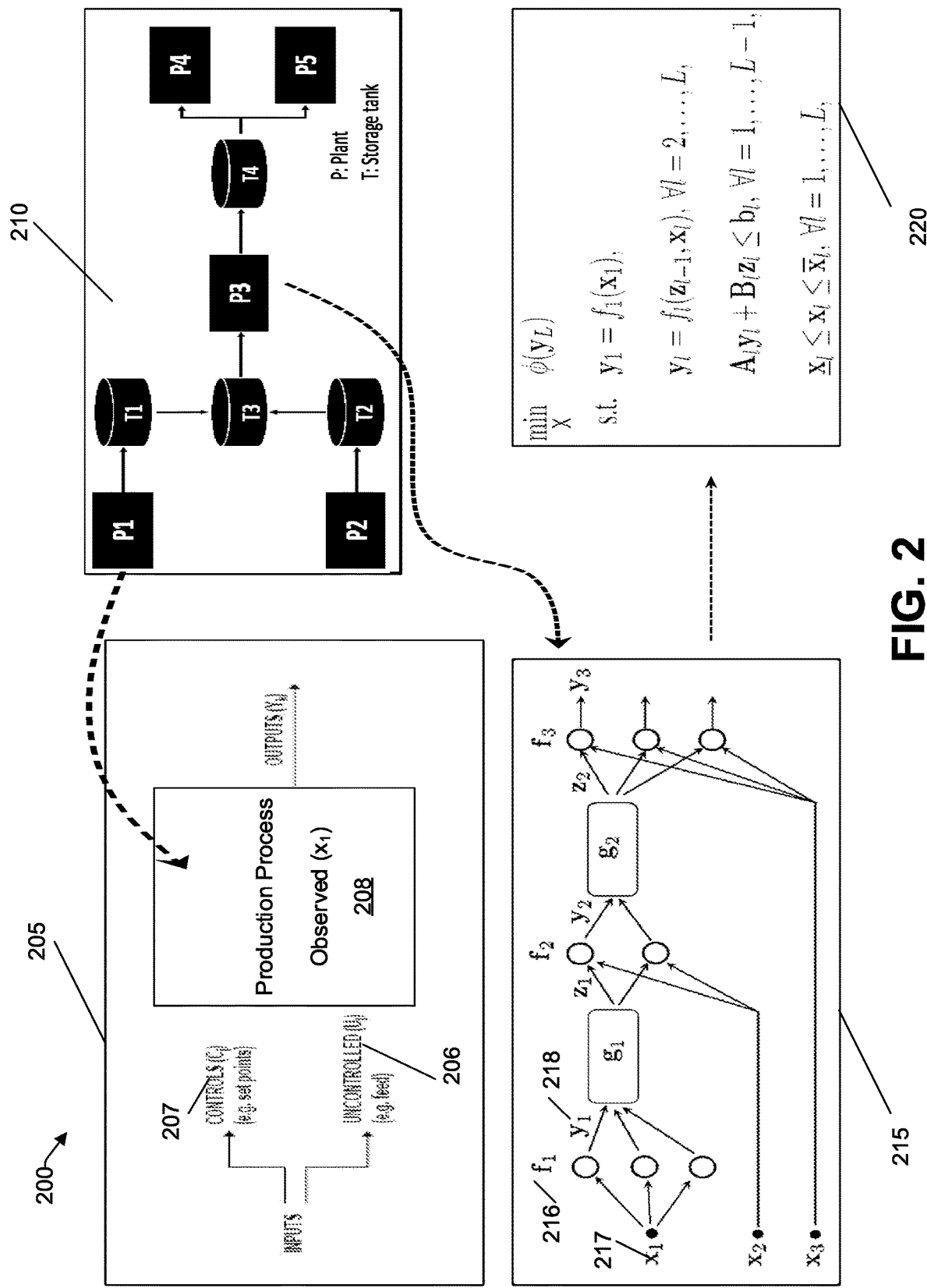
FIG. 2 illustrates an example of a regression-optimization pipeline, consistent with an illustrative embodiment.

FIG. 2 illustrates a regression-optimization pipeline 200, consistent with an illustrative embodiment. As shown at block 205, a plurality of processes is shown. For example, based on inputs that are controllable 207 (e.g., set-points for temperature) and uncontrollable 206 (type or quality of raw materials) a production process 208 is estimated using a regression function. Block 210 is a representation of the production of various processes of plants (e.g., P1, P2) and tanks in a feed forward process. In this non-limiting application, an oil production facility is used for illustrative purposes, but the present disclosure has a wide application in processing and manufacturing. At box 215 a generalized network representation is shown, where $f_i$ is a regression function 216 of $f_1$, $f_2$ and $f_3$. Inputs x1 217 to x3 are independent variables, and Y 218 are dependent (e.g., responsive). The circular nodes identify a process where a regression function is built, and the rectangular nodes (e.g., "g1") represents the operational constraints.

With continued reference to FIG. 2, box 220 is an optimal control model of constrained optimization problem. More particularly, with regard to the constrained optimization problem, it is shown that:

Min $\theta$ ($y_L$)

X s.t. $y_1 = f_1(x_1)$;

$y_l = f_l(z_{l-1}, x_l) \forall l = 2, \ldots, L,$ $A_l y_l + B_l z_l \leq b_l, \forall l = 1, \ldots, L-1,$ (1)

$\underline{x}_l \leq x_l \leq \overline{x}_l, \forall l = 1, \ldots, L,$ $\underline{y}_l \leq y_l \leq \overline{y}_l, \forall l = 1, \ldots, L,$ $\underline{z}_l \leq z_l \leq \overline{z}_l, \forall l = 1, \ldots, L-1;$ Where $X = (x_1, \ldots, x_L; y_1, \ldots, y_L; z_1, \ldots, z_{L-1})$ and the objective function $\theta(y_L)$ depends on the output at the last layer. Define $\underline{x}_l$ and $\overline{x}l$ as lower and upper bounds on control set-points, $\underline{z}_l$ and $\overline{z}_l$ are limits for inflows of processes are $\underline{y}l$ and $\overline{y}l$. The linear constraint $A_{ly_l} + B_{l z_l} \leq b_l$ captures mass balance and flow rate equations between the l-th process layer. An example for operational constraints to be included in the linear constraint is the tank storage constraint for T4 (i.e., l=2):

$y2 - z_2^1 - z_2^2 - s2 = 0$ $\underline{s}_2 \leq s_2 \leq \overline{s}_2$, where s2 is the tank level for T4, and $\underline{s}2$ and $\overline{s}2$ are storage limits.

Figure 3A:
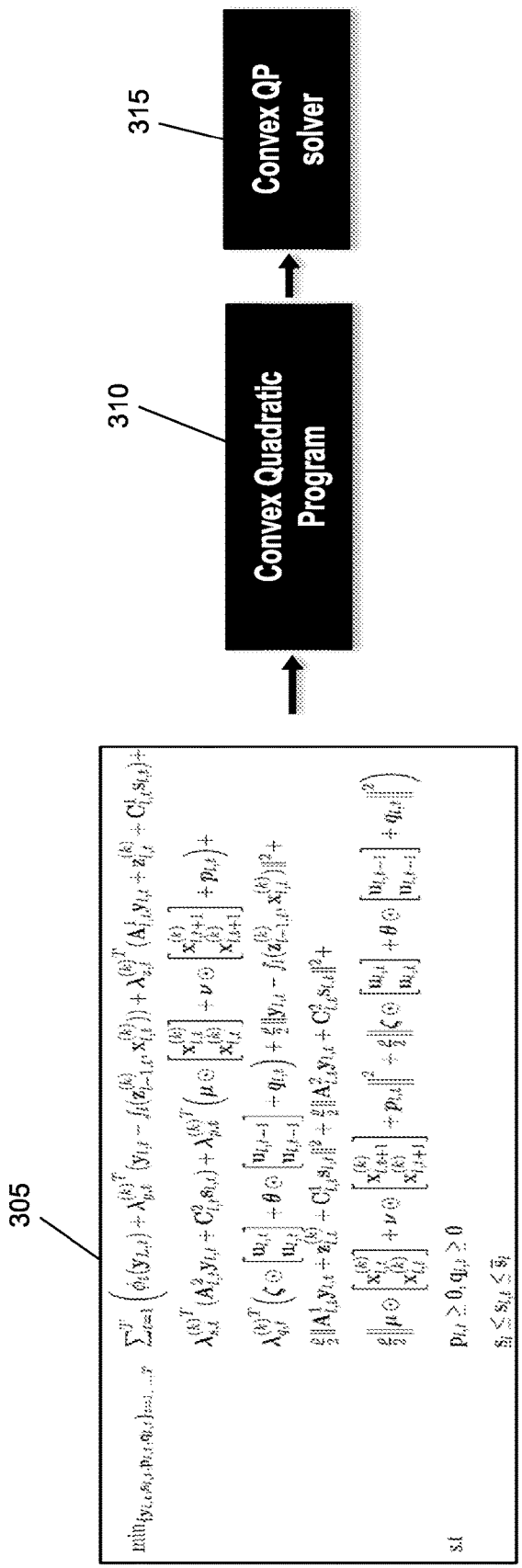
FIGS. 3A and 3B illustrate a decomposition approach based on defining two sub-problems, consistent with an illustrative embodiment.
Figure 3B:
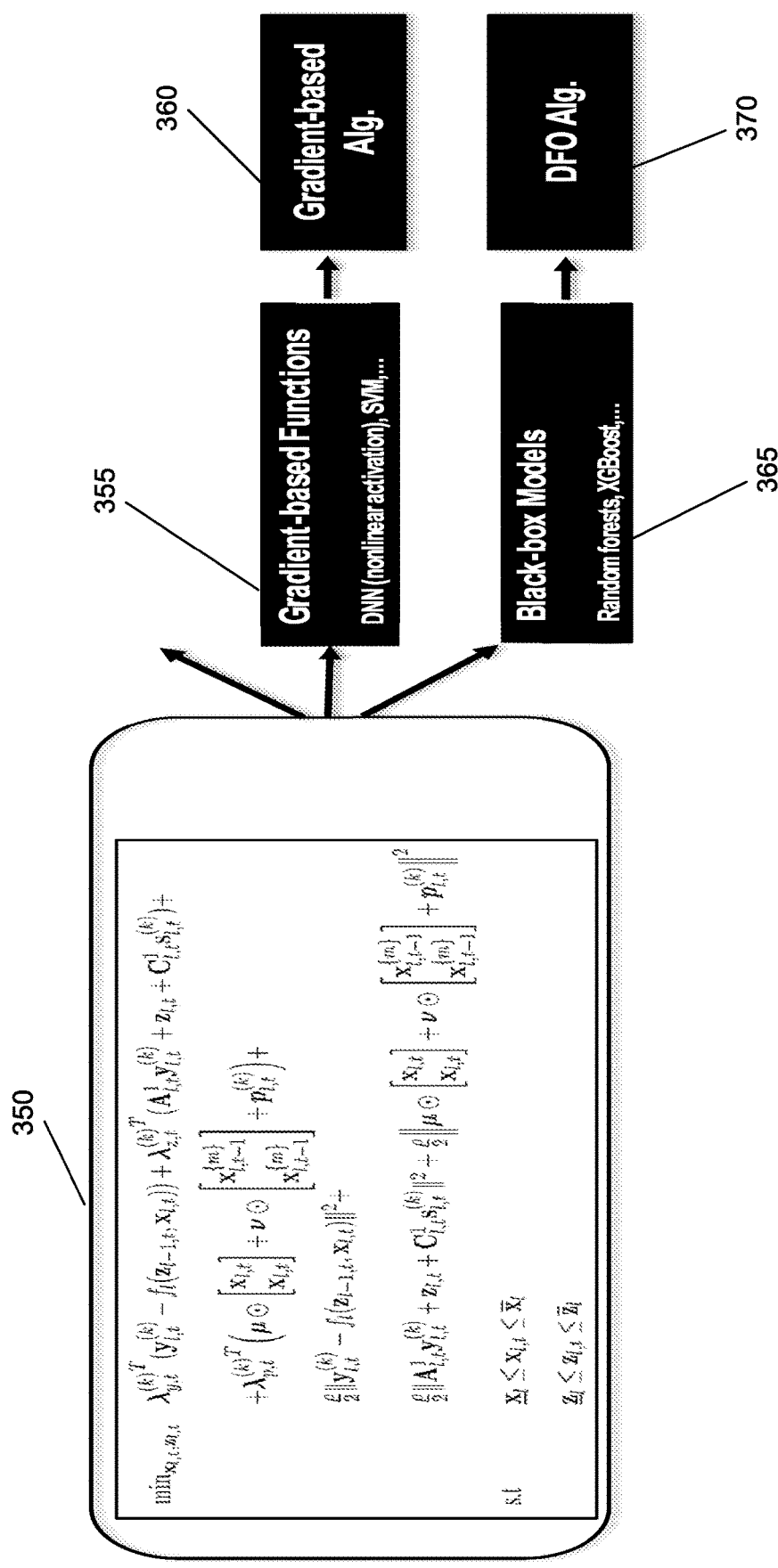

FIGS. 3A and 3B illustrate a decomposition approach 300A, 300B based on defining two sub-problems, consistent with an illustrative embodiment. In decomposition, a coupled complex model is decomposed into multiple sub-problems. For example, a coupled complex model with temporal coupling and spatial coupling, is separated by temporal decomposition and spatial decomposition. A single-period optimization can be solved and the solutions used for the particular control variables. The first sub-problem 305 shown in FIG. 3A is solved using a convex quadratic program (QP) 310 and convex QP solver 315. The second sub-problem 350 shown in FIG. 3B includes gradient based functions 355, gradient based algorithms 360, black box models 365, and derivative-free optimization (DFO) algorithm 370. It is to be understood that the decomposition approach is shown for illustrative purposes and the functions and models used do not limit the use of decomposition as described in the present disclosure.

FIG. 3C illustrates a two-level two-block algorithm consistent with an illustrative embodiment. The algorithm shown is a decomposition algorithm that utilizes an alternating direction method of multipliers (ADDM) to perform an optimization of a complex model. A solution to an optimization problem can be found in a distributed way, which may be performed in parallel. A first step 380 for each layer is solved, followed by performing a two-block ADMM 385 operation to update the values for the layers. The operation can be formed iteratively 390 for even and odd temporal periods t.

Figure 4:
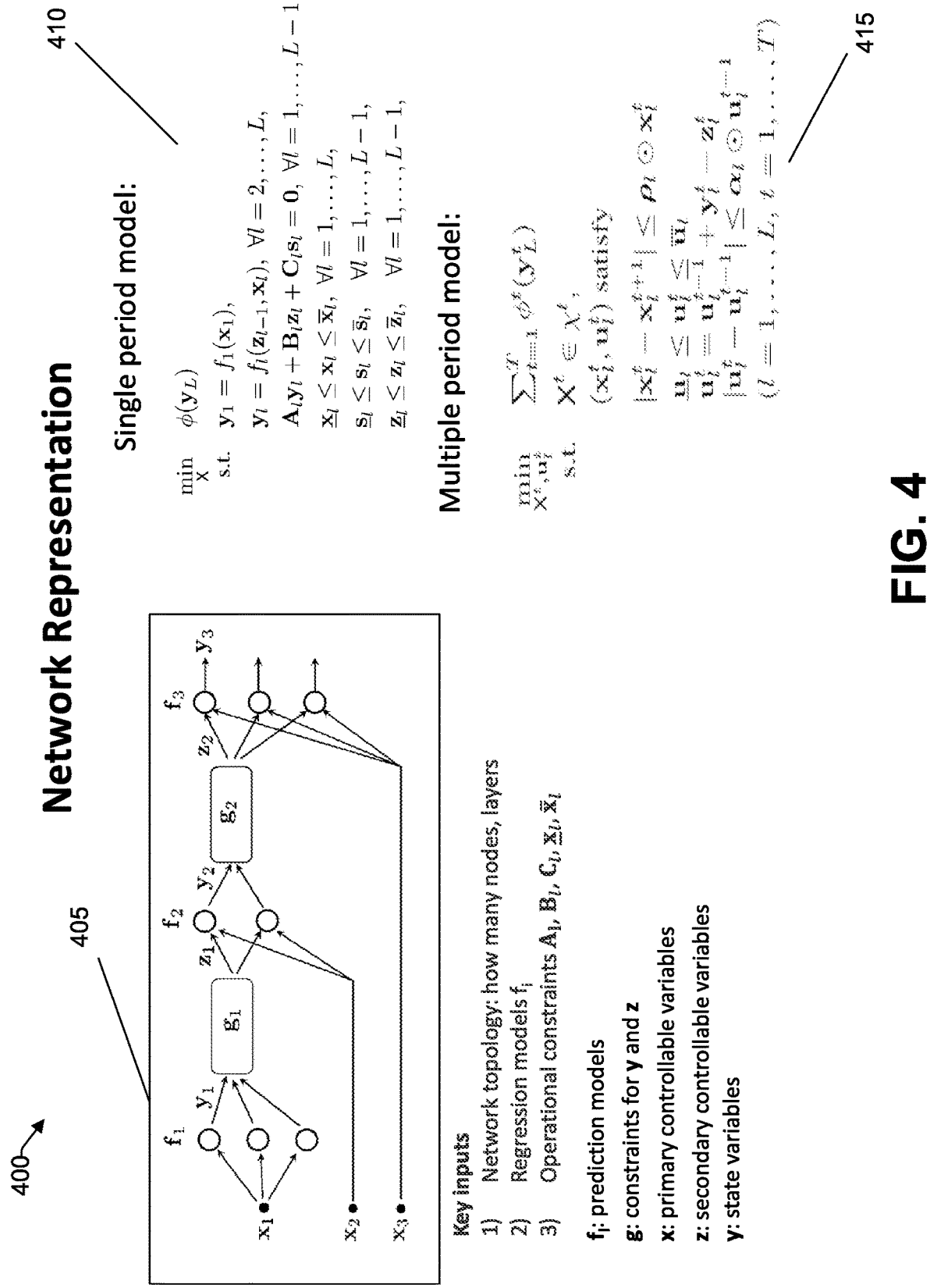
FIG. 4 illustrates an example of a network representation model, consistent with an illustrative embodiment.

FIG. 4 illustrates a network representation model 400, consistent with an illustrative embodiment. The network representation 405 has a network topology of nodes and layers and operational constraints are input. The network representation is similar to the description in FIG. 2 above and with regard to the single period model 410. The multiple period model 415 is provided with service level constraints for comparing the effects of commonality in the single-period and multiple-period case.

Figure 5:
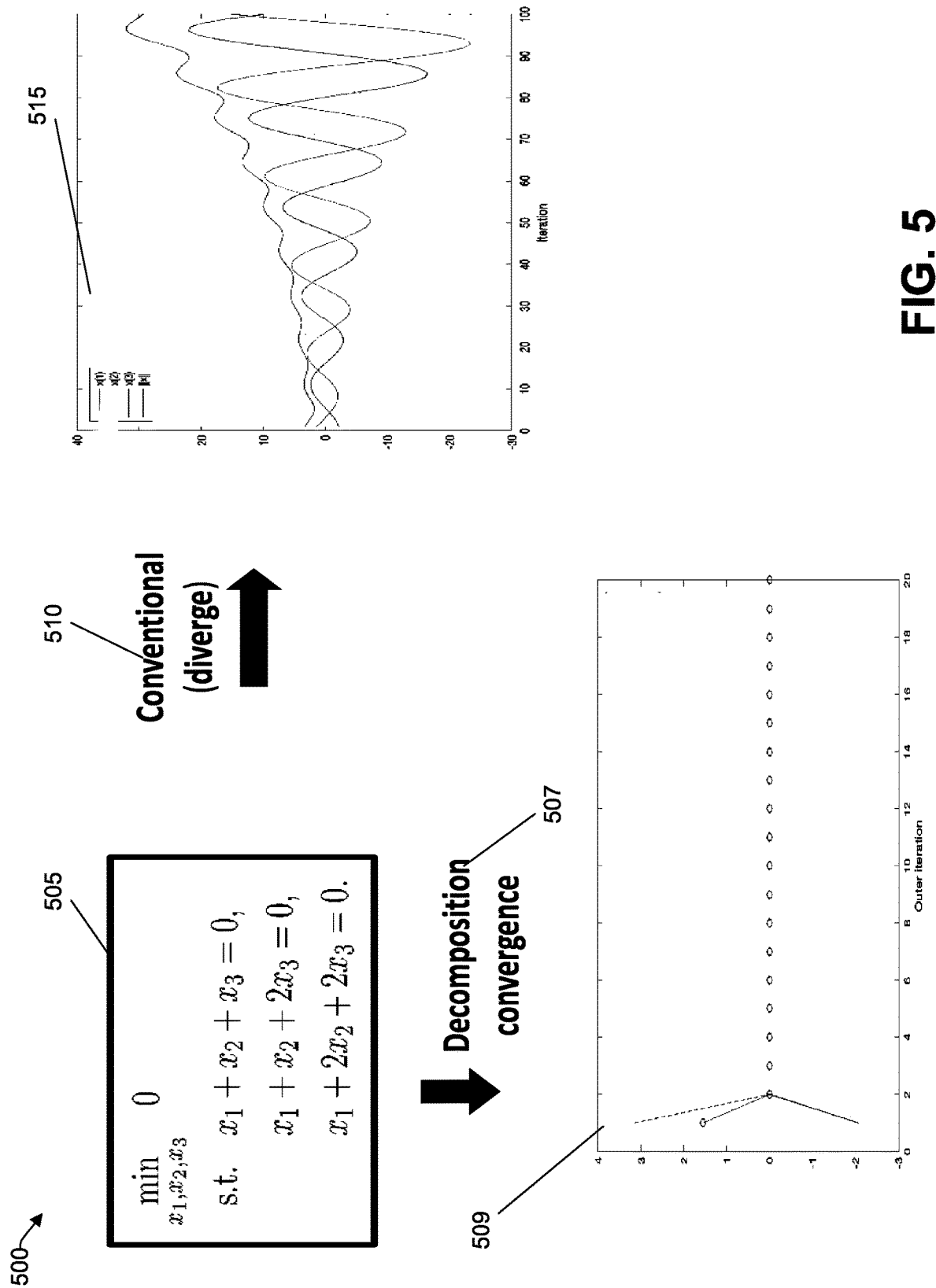
FIG. 5 is an illustration of finding an optimal solution, consistent with an illustrative embodiment.

FIG. 5 is an illustration 500 of finding an optimal solution 500, consistent with an illustrative embodiment. In FIG. 5, to obtain an optimal solution for the operation 505, it is shown that in a conventional approach 510 to optimizing solutions where there is no decomposition performed 515, there is a significant amount of divergence of a gap of optimal solutions as the number iterations is performed. By comparison, using the decomposition approach 507 according to the present disclosure, there is a decrease in the gap as the iterations are performed (as shown in graph 509). Thus, the decomposition convergence is greatly enhanced, particularly with regard to primal and dual solutions.

Figure 6:
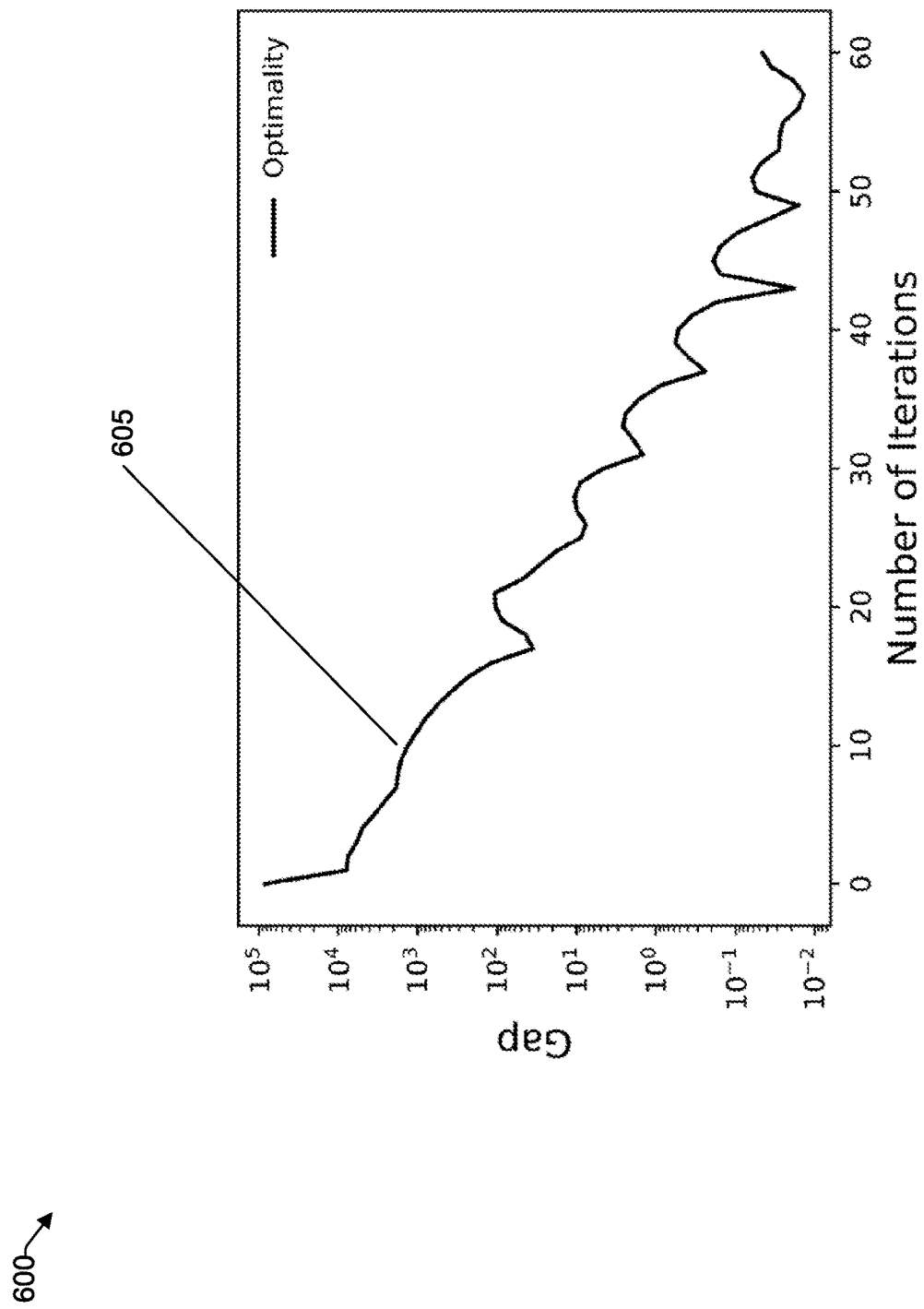
FIG. 6 is a graph illustrating the convergence of an optimization algorithm, consistent with an illustrative embodiment.

FIG. 6 is a graph 600 illustrating the convergence of an optimization algorithm operation, consistent with an illustrative embodiment. The algorithm progress 605 is shown as the optimality gap as the first-order optimality condition versus the number of iterations. It is shown that as the number of iterations reaches 40, there is a steep decline in the duality gap (increased convergence) between primal and dual solutions.

Figure 7:
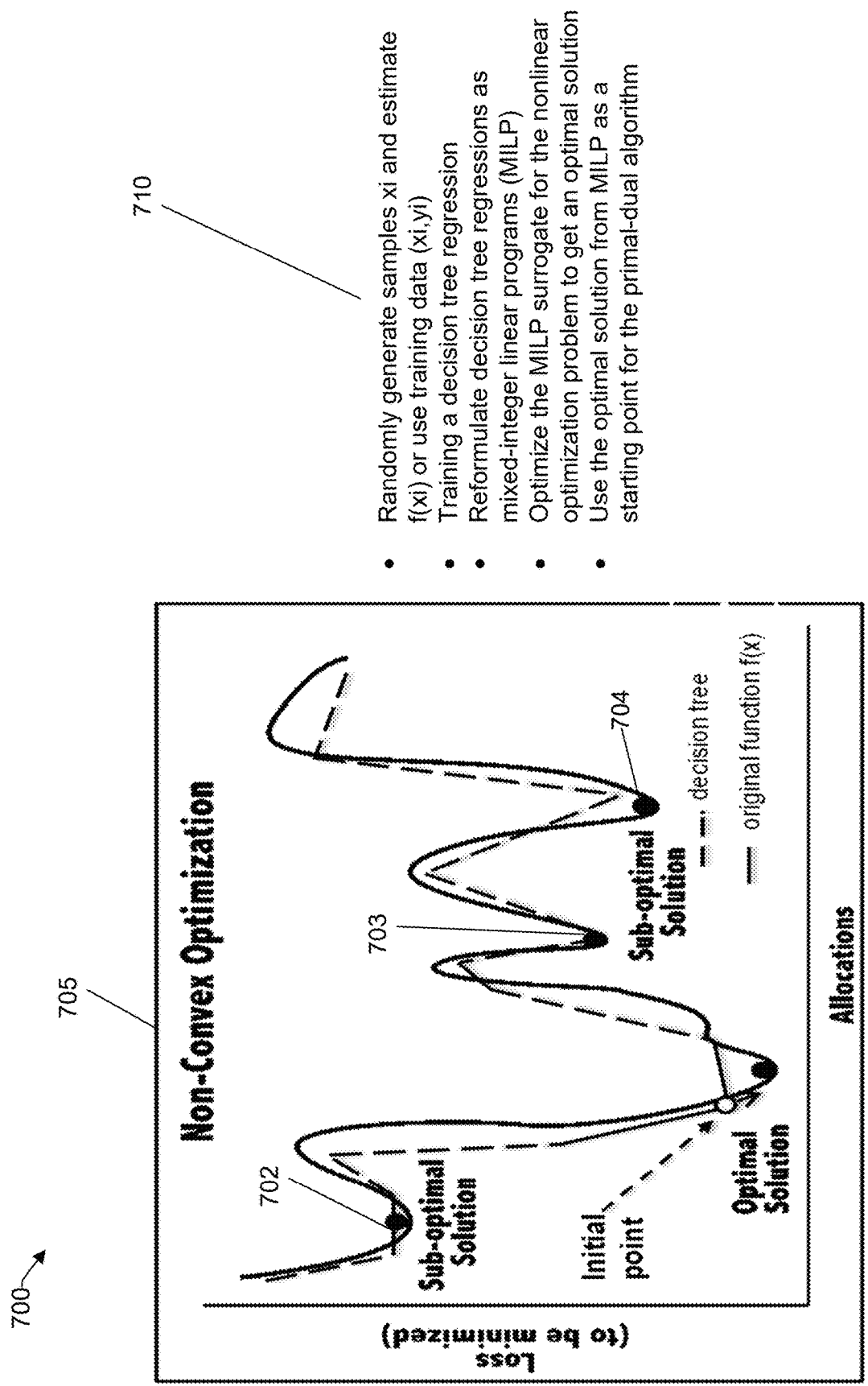
FIG. 7 is a graph showing enhanced solution quality in a non-convex optimization operation, consistent with an illustrative embodiment.

FIG. 7 is a graph 700 showing enhanced solution quality in a non-convex optimization operation, consistent with an illustrative embodiment. A non-convex optimization problem is shown in a graph of allocations versus loss. The graph shows how the solution quality is improved, as the use of the decision tree is approximate to finding the optimal function. There are sub-optimal solutions 702, 703, 704 and the optimal solution 705 having the lowest amount of loss. The operation of the non-convex optimization 710 includes randomly generating samples and estimating f(xi) or use training data (xi, yi). A decision tree regression model is trained. The decision tree regressions are then reformulated as mixed-integer linear programs (MILP). The optimal solution from the MILP is used as a starting point to perform a primal-dual algorithm.

Figure 8:
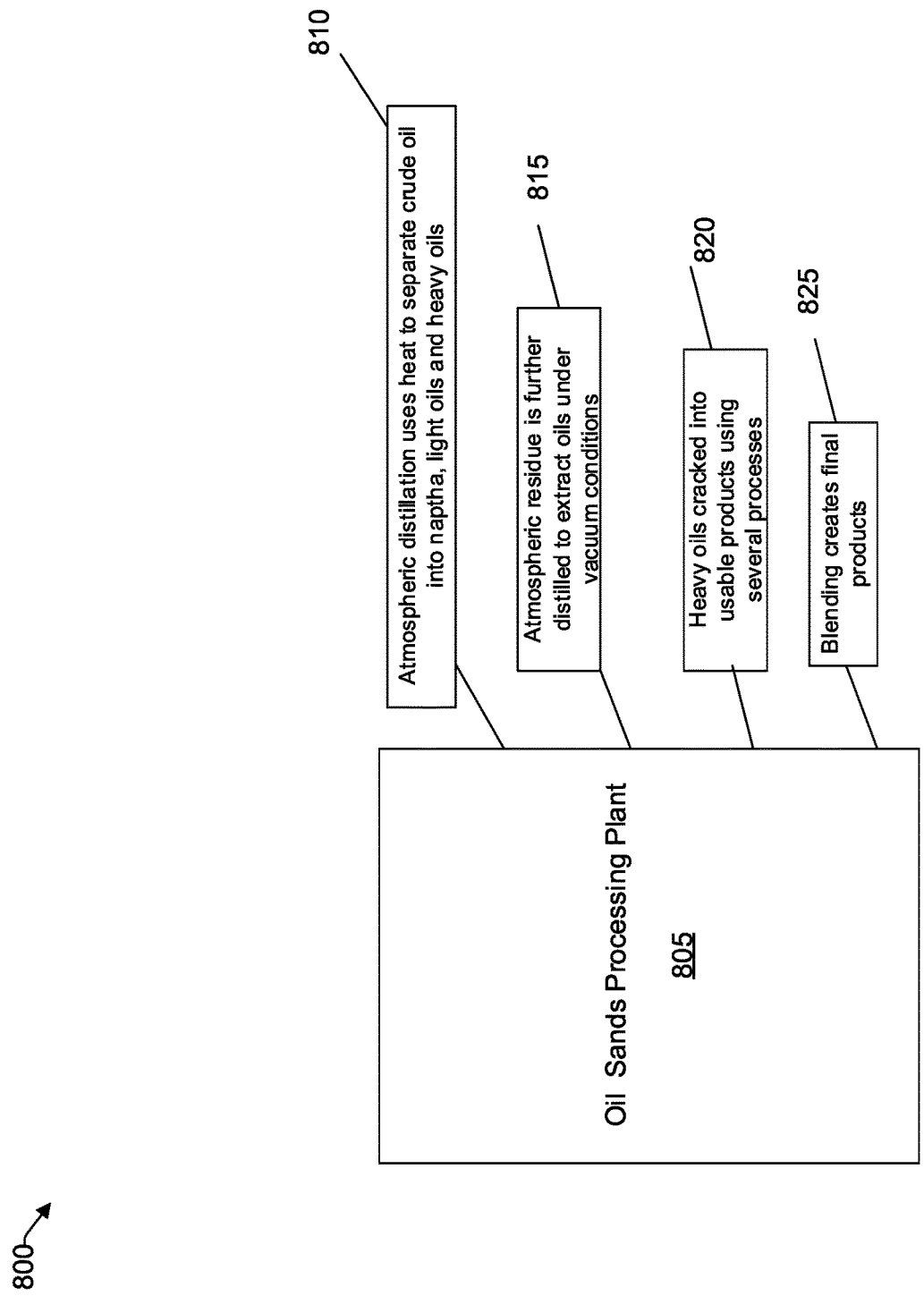
FIG. 8 illustrates an operation for set-point recommendation of an oil sands operation, consistent with an illustrative embodiment.

FIG. 8 illustrates an operation for set-point recommendation of an oil sands operation 800, consistent with an illustrative embodiment. There are shown four basic operations in a sands oil plant 805 that have set-points for control. The operations include atmospheric distillation 810 to separate crude oil into naphtha, light oil, and heavy oil using heat. Atmospheric residue distillation 815 is used to extract oils under vacuum conditions. Heavy oil cracking 820 is performed to create usual products using several processes. A blending operation 825 is used to create final products. The set-points are set to control all of these operations 810-825 in the oil sands operation.

Figure 9A:
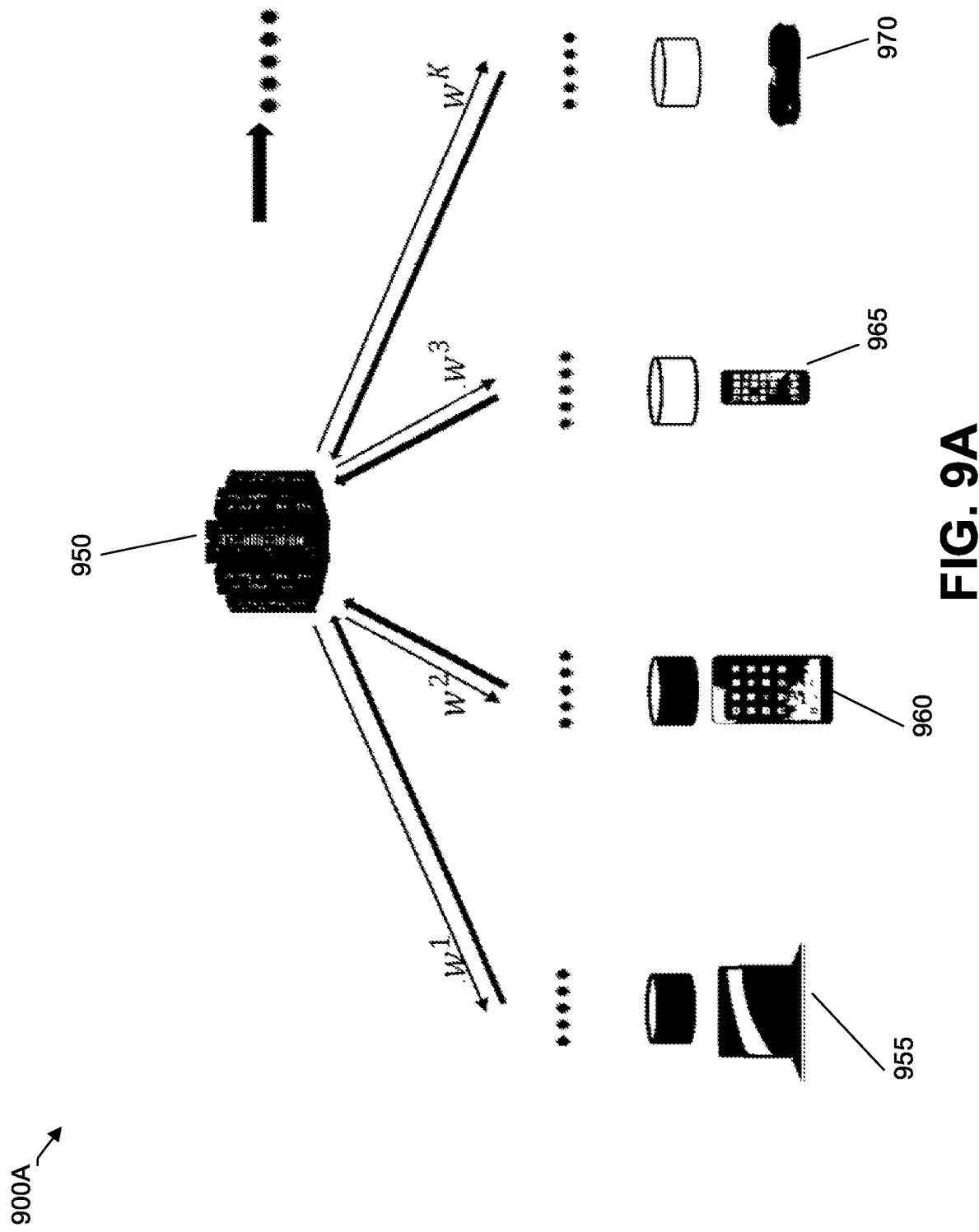
FIG. 9A illustrates a federated learning framework, consistent with an illustrative embodiment.

FIG. 9A illustrates a federated learning framework 900A, consistent with an illustrative embodiment. A federated learning framework is one solution to preserve data privacy and exploit distributed computing resources. An automated central operator 950 initializes a plurality of set-points for every process of the network of multiple plants, a vector value and an index. Each of the plants of the multiple plants are represented by the different devices 955, 960, 965, and 970 to be in communication with the automated central operator 950. Each device 955, 960, 965, and 970 includes particular initialized set-points from the plurality of set-points, the vector value and index associated with the particular initialized set-points. The automated central operator 950 receives an updated vector value after each plant performs a self-optimization problem from each device 955, 960, 965, and 970. The devices do not share their specific data but benefit from the federation via the automated central operator 950.

FIG. 9B illustrates an algorithm 900B for federated learning for optimal set point control, consistent with an illustrative embodiment. At 975, the automated central operation initializes the set points. At 980, the central solves a local optimization problem. At 985, the central operator sends a vector signal an l-th client (such as shown in FIG. 9A). At 990, the l-th client solves its own optimization problem for odd t-periods, then for even t-periods. The l-th client then sends an updated vector signal to the central operator. At 993, the central operator updates the optimization, and at 995, determines whether the stopping criterion has been reached at which the algorithm is terminated.

Example Process

Figure 10:
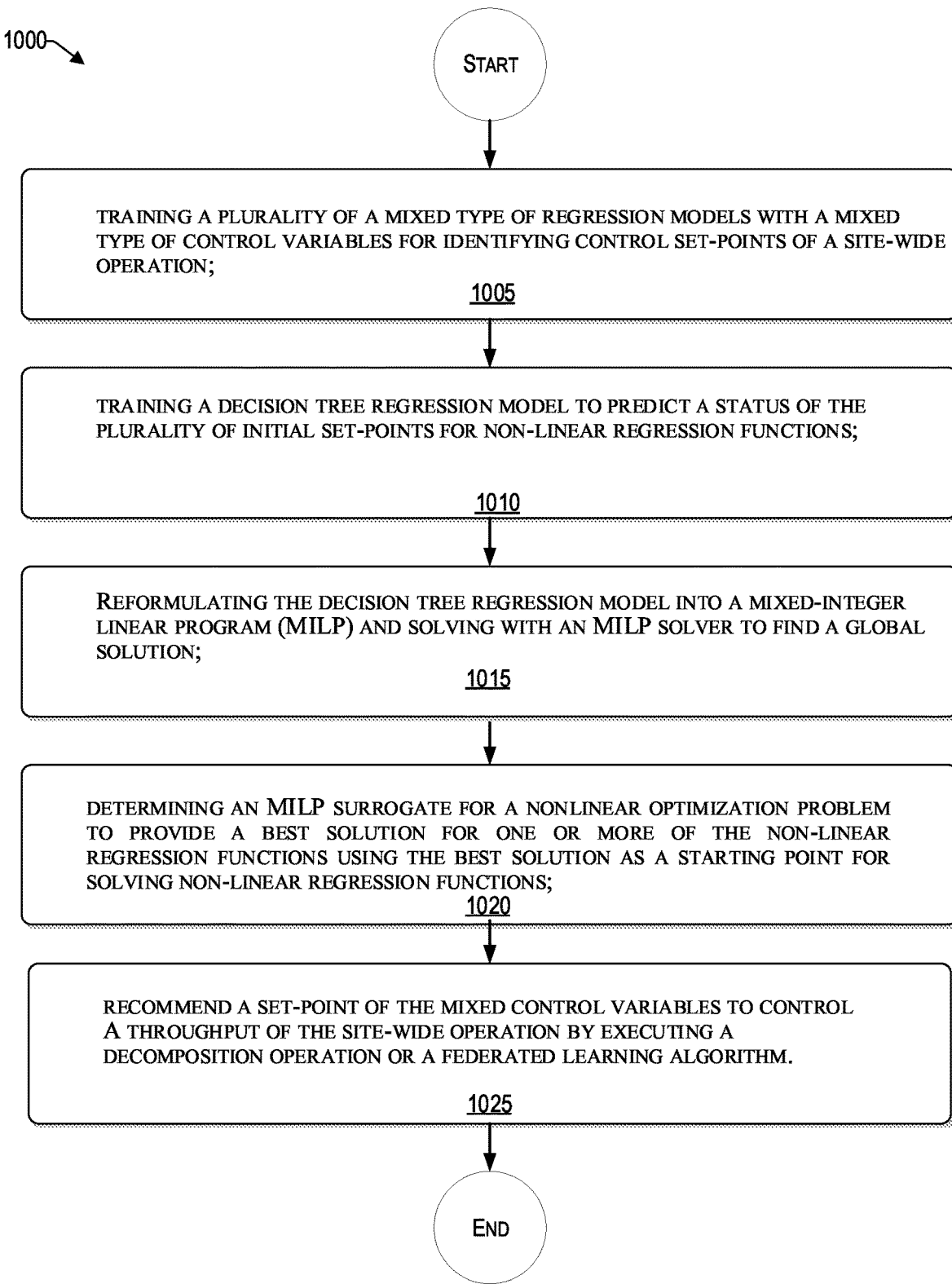
FIG. 10 is a flowchart illustrating a computer-implemented method of a site-wide prediction optimization, consistent with an illustrative embodiment.

With the foregoing overview of the example architecture, it may be helpful now to consider a high-level discussion of an example process. To that end, FIG. 10 is a flowchart illustrating a computer-implemented method of consistent with an illustrative embodiment. FIG. 10 is shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At operation 1005, a plurality of mixed regression models is trained to operate a plurality of feed forward functions with mixed control variables on a site-wide operation. The mixed regression models are, for example, data driven representations in the site-wide optimization operations. In the example where the site is an oil sands production facility, each of the regression models can be a representation of each plant, with a run-time complexity, scalability, and may include solution quality guarantees. In the case of an oil production site, optimization includes devising strategies that maximizes oil production under normal conditions, and in the event of unplanned breakdowns and upsets.

At operation 1010, a decision tree regression model is trained to predict a status of the plurality of feed forward functions. The decision tree regression model can include leaf nodes and branching nodes. The decision tree model learns features of an object and trains a model in a tree structure for predicting future data to produce meaningful continuous output.

At operation 1015, the decision tree regression model is reformulated into a mixed-integer linear program (MILP). The use of an MILP permits obtaining a globally optimal solution to nonconvex problems with the help of exact methods such as branch-and-bound and branch-and-cut.

At operation 1020, an MILP surrogate is determined for a nonlinear optimization problem to provide a best solution for one or more of the feed forward functions. In a case where an outcome of interest is not easily measured directly, a model of the desired outcome can be used to save time and computer resources.

At operation 1025 a recommended set-point of one or more the mixed control variables is provided to control a throughput of the site-wide operation. The set-points may different based on what is being controlled by the respective mixed control variables. Although the functions are feed forward functions, a change in the mixed control variables can have a significant input on the throughput in terms of quantity and quantity.

Example Particularly Configured Computer Hardware Platform

Figure 11:
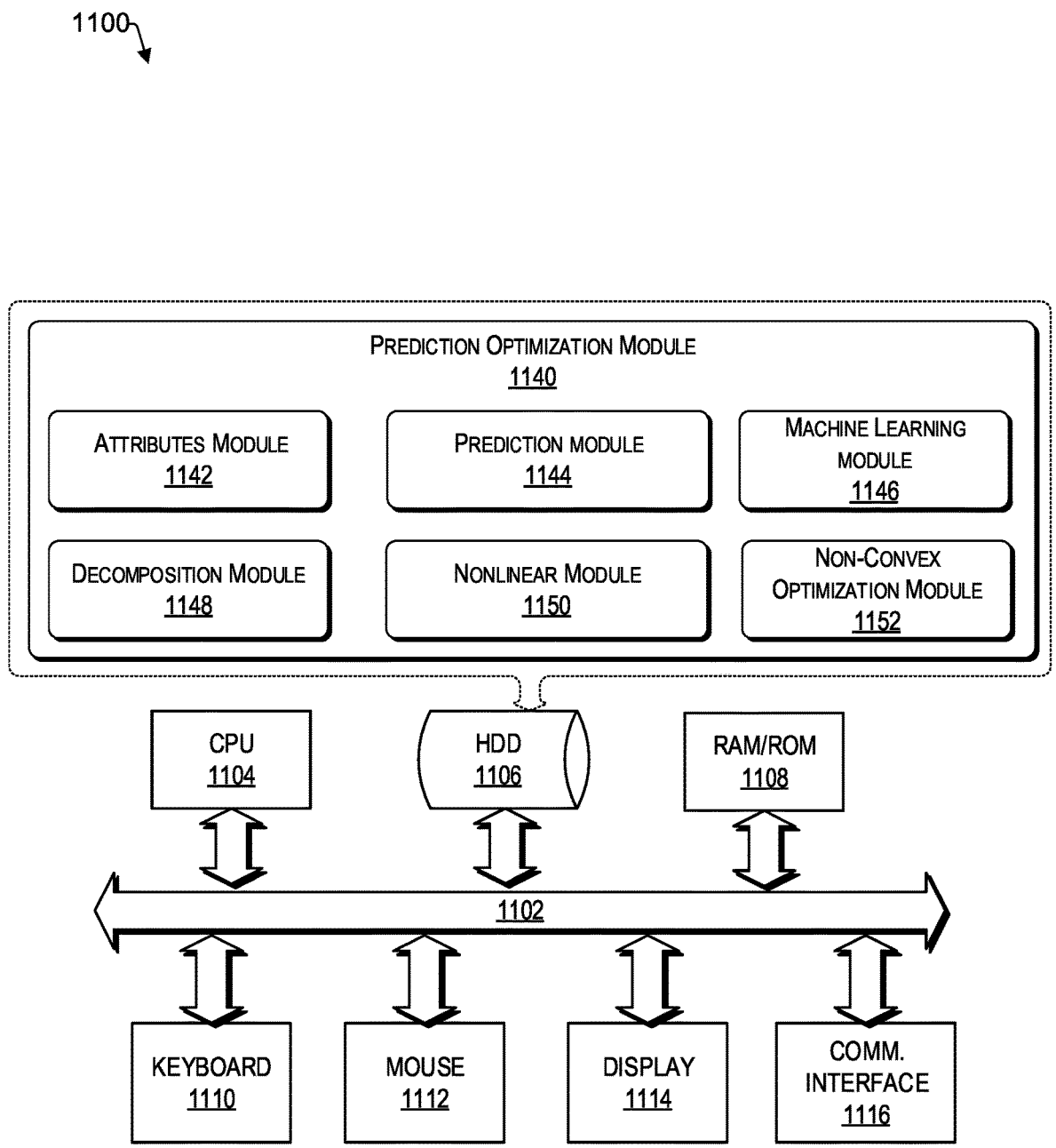
FIG. 11 is a functional block diagram illustration of a particularly configured computer hardware platform, consistent with an illustrative embodiment.

FIG. 11 provides a functional block diagram illustration 1100 of a computer hardware platform. In particular, FIG. 11 illustrates a particularly configured network or host computer platform 1100, as may be used to implement the method shown in FIG. 10.

The computer platform 1100 may include a central processing unit (CPU) 1104, a hard disk drive (HDD) 1106, random access memory (RAM) and/or read-only memory (ROM) 1108, a keyboard 1110, a mouse 1112, a display 1114, and a communication interface 1116, which are connected to a system bus 1102. The HDD 1106 can include data stores.

In one embodiment, the HDD 1106 has capabilities that include storing a program that can execute various processes, such as machine learning and prediction optimization.

In FIG. 11, there are various modules shown as discrete components for ease of explanation. However, it is to be understood that the functionality of such modules and the quantity of the modules may be fewer or greater than shown.

The prediction optimization module 1140 is configured to control the operation of the modules 1142-1152 to perform the various operations for site-wide optimization for mixed regression models and mixed control variables, consistent with an illustrative embodiment. The attributes module 1142 provides information about the various operations used to generate respective set-points of the various processes site-wide, and such information is used by the machine learning module 1146 to model complex processes in production and/or enterprise. For example, the machine learning module 1146 uses information from the attributes model to create and tune mixed regression models and mixed control models. The prediction module 1144 is configured to provide information (including but not limited to constraints and key performance indicators during processing or manufacture) about a predicted throughput in various stages of manufacture or processing. The prediction module 1144 is configured to provide prediction information, which may be in the form of a decision tree regression model, or such information can be provided to update a decision tree regression model to learn nonlinear functions. The prediction module 1144 is configured to analyze input to output relationships in a data driven manner, to reduce or eliminate process simulators and estimated relationship approaches.

The decomposition module 1148 is configured to analyzing complex behavioral models by defining two or more model types of mixed regression models and mixed control variables into respective sub-operations. The non-linear module 1150 is configured to provide an optimal solution such as when a Mixed-Integer Linear Programming (MILP) surrogate is used for reformulated decision tree regressions.

The non-convex optimization module 1152 is configured to perform optimizations for each of the respective suboperations defined by the decomposition module. One non-limiting way to provide such optimization is by executing a plurality of iterations of the mixed regression models. The non-convex optimization model 1152 is used to identify multiple locally sub-optimal points of certain functions and to identify set-points that can provide an optimal solution.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 12:
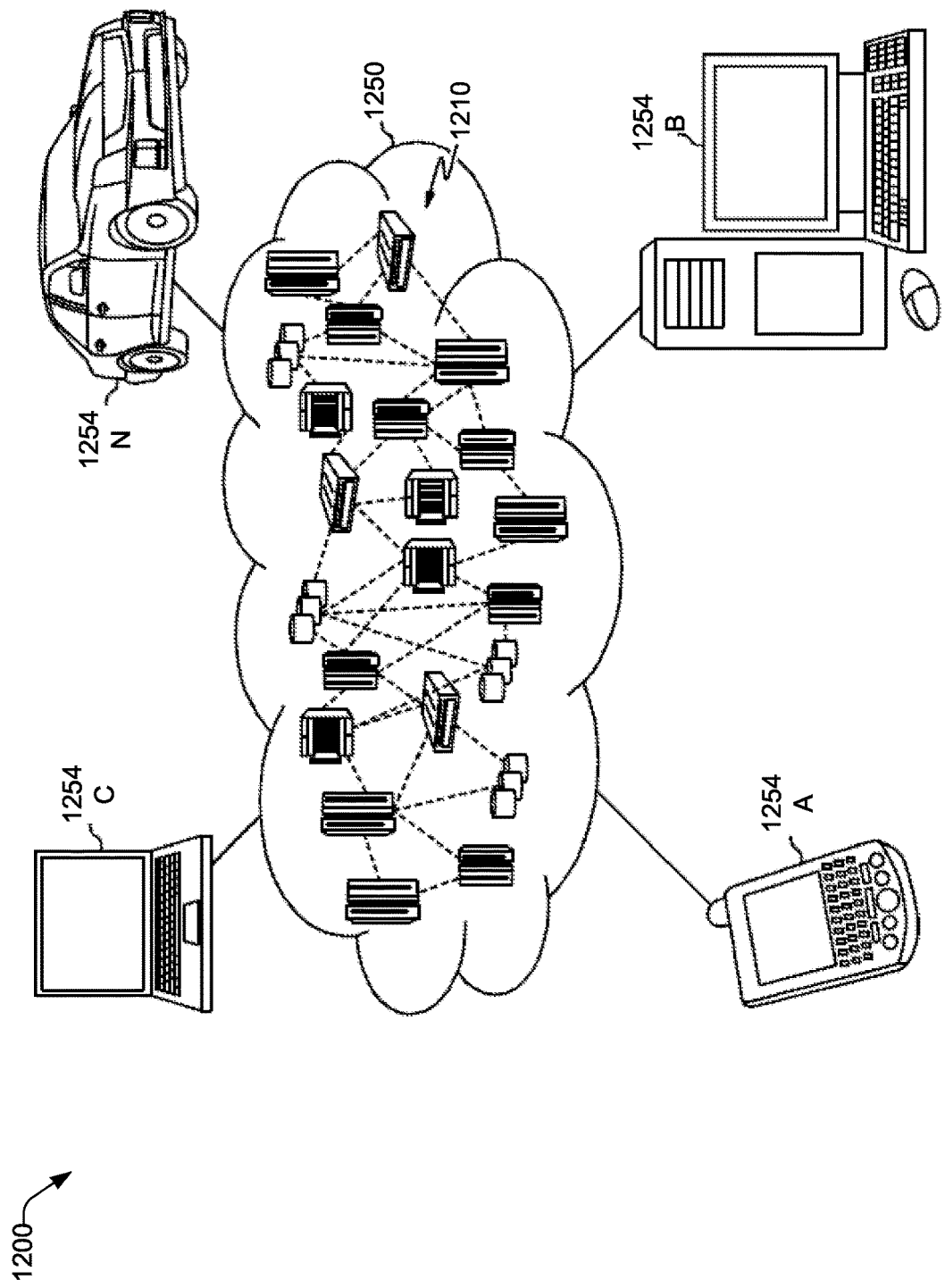
FIG. 12 depicts an illustrative cloud computing environment, consistent with an illustrative embodiment.

Referring now to FIG. 12, an illustrative cloud computing environment 1200 utilizing cloud computing is depicted. As shown, cloud computing environment 1200 includes cloud 1250 having one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms, and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1200 can communicate with any type of computerized device over any type of network and/or network addressable connection (e.g., using a web browser).

Figure 13:
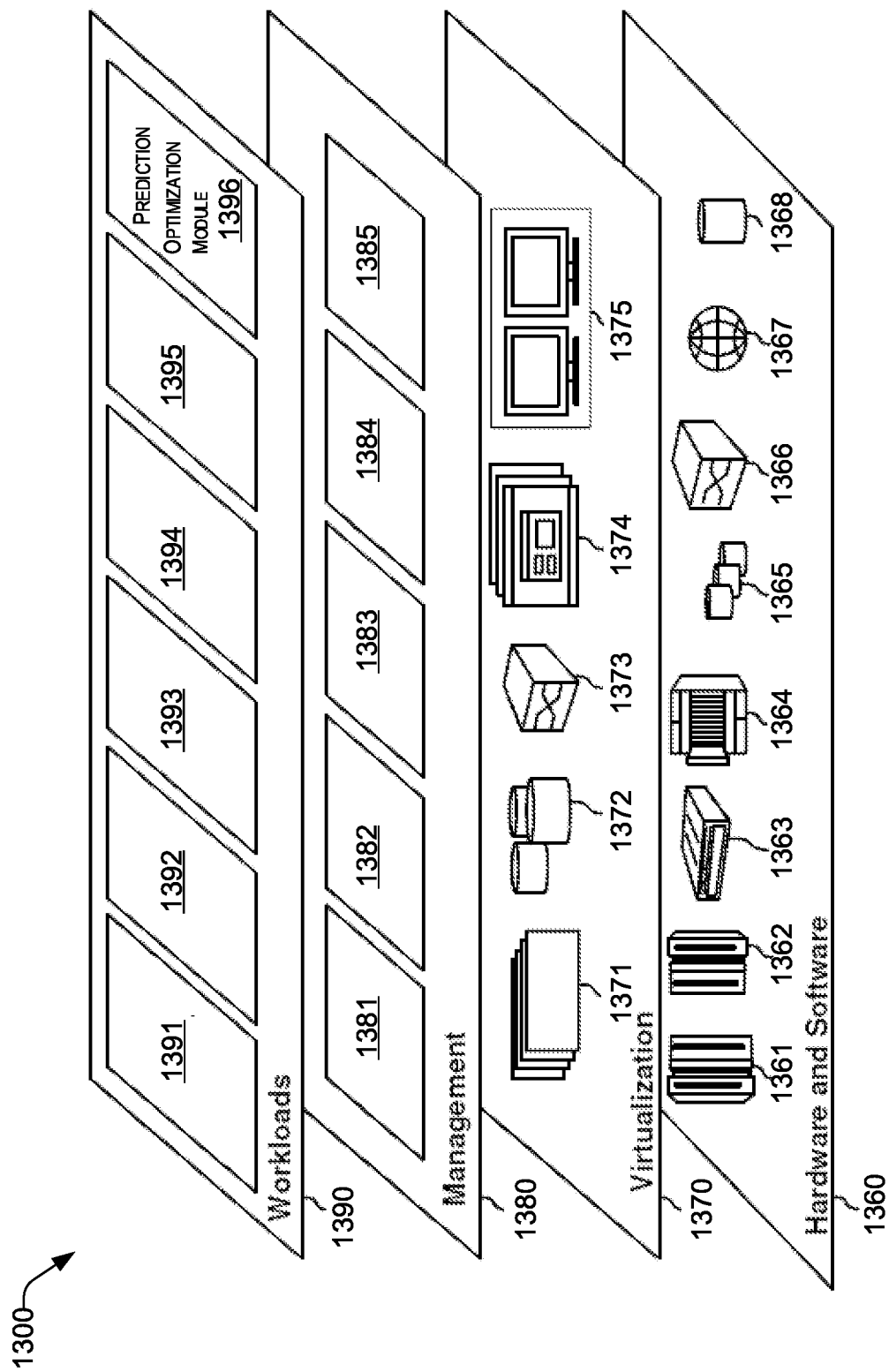
FIG. 13 depicts a set of functional abstraction layers provided by a cloud computing environment, consistent with an illustrative embodiment.

Referring now to FIG. 13, a set of functional abstraction layers 1300 provided by cloud computing environment 1250 (FIG. 6) is shown. It should be understood in advance that the components, layers, and functions shown in FIG. 13 are intended to be illustrative only and embodiments of the disclosure are not limited thereto. As depicted, the following layers and corresponding functions are provided:

Hardware and software layer 1360 include hardware and software components. Examples of hardware components include: mainframes 1361; RISC (Reduced Instruction Set Computer) architecture-based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and a module 1396 configured to for site-wide prediction optimization with mixed regression models and mixed control variables, as discussed herein above.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for a site-wide prediction optimization of an industrial plant, the computer-implemented method comprising:
   training a plurality of a mixed type of regression models with a mixed type of control variables, to operate a plurality of feed forward functions;
   identifying control set-points of a site-wide industrial plant operation for the mixed type of control variables, based on the training of the plurality of the mixed type of regression models;
   training a decision tree regression model to predict a status of the identified control set-points for the plurality of feed forward functions;
   reformulating the decision tree regression model into a mixed-integer linear program (MILP) and solving the MILP with an MILP solver to find a global solution;
   determining an MILP surrogate for a nonlinear optimization problem to provide an optimal solution for the plurality of feed forward functions;
   solving, using the optimal solution as a starting point, the nonlinear optimization problem;
   finding the global solution based on the solving of the nonlinear optimization problem, wherein the global solution corresponds to optimized control set-points of the identified control set-points; and
   automatically performing, based on the optimized control set-points, a real-time adjustment of the mixed type of control variables to maximize a throughput of the site-wide industrial plant operation by executing a decomposition operation or a federated learning algorithm.

2. The computer-implemented method of claim 1, further comprising providing the optimal solution from the MILP surrogate as a starting point for performing a primal-dual operation.

3. The computer-implemented method of claim 1, further comprising recommending the optimized control set-points for the mixed type of control variables, wherein the recommending includes recommending one or more control set-points of the optimized control set-points for one or more of a continuous variable, an integer variable, or a categorical variable.

4. The computer-implemented method of claim 1, wherein the training of the plurality of the mixed type of regression models includes selecting two or more model types comprising piece-wise linear models, nonlinear models, or black-box models.

5. The computer-implemented method of claim 4, further comprising performing the decomposition operation by defining the two or more model types of the plurality of the mixed type of regression models as two subproblems for recommending a control set-point of the optimized control set-points, of each of the mixed type of control variables.

6. The computer-implemented method of claim 5, wherein
   the performing of the decomposition operation comprises a temporal decomposition of a problem into the two subproblems, and
   each subproblem of the two subproblems is related to either a regression function or a convex quadratic program.

7. The computer-implemented method of claim 1, wherein the training the decision tree regression model includes randomly generating samples of a controllable variable xi and estimating a function f(xi) of the controllable variable.

8. The computer-implemented method of claim 1, wherein
   the site-wide industrial plant operation comprises an oil sands production facility including a network of multiple plants with each plant having a set of inputs and outputs, and
   the computer-implemented method further comprises estimating an operation of each process of the network of the multiple plants using a regression function.

9. The computer-implemented method of claim 8, further comprising arranging each plant of the multiple plants of the network in a federated learning framework to preserve one or more of an objective information, a constraint information, or a private information.

10. The computer-implemented method of claim 8, further comprising:
    initializing, by an automated central operator, a plurality of set-points for every process of the network of the multiple plants, a vector value, and an index;
    sending, to each plant of the multiple plants, particular initialized set-points from the plurality of set-points, the vector value, and the index associated with the particular initialized set-points; and
    receiving by the automated central operator an updated vector value after each plant of the multiple plants performs a self-optimization problem from each plant of the multiple plants.

11. A computer-implemented method for site-wide prediction optimization of an industrial plant, the computer-implemented method comprising:
    training a plurality of a mixed type of regression models with a mixed type of control variables, to operate a plurality of feed forward functions;
    performing a decomposition operation of a site-wide optimization operation by defining two or more model types of the mixed type of regression models and the mixed type of control variables into respective suboperations;
    executing, for each suboperation of the respective suboperations, a plurality of iterations of the mixed type of regression models until a predefined convergence is obtained;
    performing, based on the executing of the plurality of iterations, an optimization of each suboperation of the respective suboperations, wherein the performing of the optimization includes:
        identifying control set-points of a site-wide industrial plant operation for the mixed type of control variables based on the training of the plurality of the mixed type of regression models, training a decision tree regression model to predict a status of the identified control set-points for the plurality of feed forward functions, reformulating the decision tree regression model into a mixed-integer linear program (MILP) and solving the MILP with an MILP solver to find a global solution, determining an MILP surrogate for a nonlinear optimization problem to provide an optimal solution for the plurality of feed forward functions, solving, using the optimal solution as a starting point, the nonlinear optimization problem, and finding the global solution based on the solving of the nonlinear optimization problem, wherein the global solution corresponds to optimized control set-points of the identified control set-points; and automatically performing a real-time adjustment of the mixed type of control variables based on the optimization of each suboperation of the respective suboperations of the industrial plant.

12. The computer-implemented method of claim 11, wherein the performing of the optimization further comprises a non-convex optimization of each suboperation of the respective suboperations to designate the optimal solution having a lowest loss from among two or more suboptimal solutions.

13. The computer-implemented method of claim 12, wherein the non-convex optimization includes selecting one or more of prediction models and operational constraints for each suboperation of the respective suboperations.

14. The computer-implemented method of claim 11, further comprising training the decision tree regression model to learn a nonlinear function to predict the status of the identified control set-points for the plurality of feed forward functions of the site-wide optimization operation.

15. The computer-implemented method of claim 11, wherein performing the site-wide optimization operation is based on the training of the plurality of the mixed type of regression models including at least two of piece-wise linear models, nonlinear models, or black-box models, and the mixed type of control variables, and the site-wide optimization operation is performed in parallel for at least two of the respective suboperations.

16. The computer-implemented method of claim 15, further comprising providing a secure platform with privacy-preserving functions to determine the optimized control set-points for a plurality of client nodes operating in a federated learning framework.

17. A computing device configured to perform site-wide prediction optimization of an industrial plant, the computing device comprising:

a processor;

a memory coupled to the processor, the memory storing instructions to cause the processor to perform acts comprising:

training a plurality of a mixed type of regression models with a mixed type of control variables, to operate a plurality of feed forward functions;

identifying control set-points of a site-wide industrial plant operation for the mixed type of control variables, based on the training of the plurality of the mixed type of regression models;

training a decision tree regression model to predict a status of the identified control set-points for the plurality of feed forward functions;

reformulating the decision tree regression model into a mixed-integer linear program (MILP) and solving the MILP by an MILP solver to find a global solution;

determining an MILP surrogate for a nonlinear optimization problem to provide an optimal solution for the plurality of feed forward functions;

solving, using the optimal solution as a starting point, the nonlinear optimization problem;

finding the global solution based on the solving of the nonlinear optimization problem, wherein the global solution corresponds to optimized control set-points of the identified control set-points; and automatically performing, based on the optimized control set-points, a real-time adjustment of the mixed type of control variables to maximize a throughput of the site-wide industrial plant operation by executing a decomposition operation or a federated learning algorithm.

18. The computing device of claim 17, wherein the instructions further cause the processor to perform an additional act of providing the optimal solution from the MILP surrogate as a starting point for performing a primal-dual operation.

19. The computing device of claim 17, wherein the instructions further cause the processor to perform an additional act of recommending the optimized control set-points for the mixed type of control variables, and the recommending includes recommending one or more control set-points of the optimized control set-points for one or more of a continuous variable, an integer variable, or a categorical variable.

20. The computing device of claim 17, wherein the training of the mixed type of regression models includes selecting two or more model types comprising piece-wise linear models, nonlinear models, or black-box models.

21. The computing device of claim 17, wherein the instructions further cause the processor to perform an additional act comprising performing the decomposition operation by defining two or more model types of the mixed type of regression models as two subproblems for recommending a control set-point of the optimized control set-points of each of the mixed type of control variables.

22. The computing device of claim 17, wherein the decomposition operation performed comprises a temporal decomposition of a problem into two subproblems.

23. A non-transitory computer readable storage medium tangibly embodying a computer readable program code having computer readable instructions that, when executed, causes a computer device to carry out a method of site-wide prediction optimization of an industrial plant, the method comprising:

training a plurality of a mixed type of regression models, with mixed type of control variables, to operate a plurality of feed forward functions;

performing a decomposition operation of a site-wide optimization operation by defining two or more model types of the mixed type of regression models and the mixed type of control variables into respective suboperations;

executing, for each suboperation of the respective suboperations, a plurality of iterations of the mixed type of regression models until a predefined convergence is obtained;

performing, based on the executing of the plurality of iterations, an optimization of each suboperation of the respective suboperations, wherein the performing of the optimization includes:
  identifying control set-points for the mixed type of control variables of a site-wide industrial plant operation based on the training of the plurality of the mixed type of regression models,
  training a decision tree regression model to predict a status of the identified control set-points for the plurality of feed forward functions,
  reformulating the decision tree regression model into a mixed-integer linear program (MILP) and solving the MILP with an MILP solver to find a global solution,
  determining an MILP surrogate for a nonlinear optimization problem to provide an optimal solution for the plurality of feed forward functions,
  solving, using the optimal solution as a starting point, the nonlinear optimization problem, and
  finding the global solution based on the solving of the nonlinear optimization problem, wherein the global solution corresponds to optimized control set-points of the identified control set-points; and
  automatically performing a real-time adjustment of the mixed type of control variables based on the optimization of each suboperation of the respective suboperations.

24. The non-transitory computer readable storage medium according to claim 23, wherein the method further comprises performing a non-convex optimization of each suboperation of the respective suboperations to designate the optimal solution having a lowest loss from among two or more sub-optimal solutions.

25. The non-transitory computer readable storage medium according to claim 23, wherein:
  performing the site-wide optimization operation is based on the training of the plurality of mixed type of regression models including at least two of piece-wise linear models, nonlinear models, or black-box models, and the mixed type of control variables, and
  the site-wide optimization operation is performed in parallel for at least two of the respective suboperations.

* * * * *